UNITED STATES PATENT OFFICE.

LEO WALLERSTEIN, OF NEW YORK, N. Y.

METHOD OF TREATING BEER OR ALE.

995,825.  Specification of Letters Patent.  Patented June 20, 1911.

No Drawing. Original application filed April 11, 1910, Serial No. 554,645. Divided and this application filed April 8, 1911. Serial No. 619,676.

*To all whom it may concern:*

Be it known that I, LEO WALLERSTEIN, a subject of the Emperor of Germany, residing at New York, in the county of New York and State of New York, have invented certain new and useful Improvements in Methods of Treating Beer or Ale, of which the following is a specification.

This invention relates to the preparation of beers and ales, and more particularly to the preparation of improved bottled beers, the object of the invention being the production of bottled beers which possess great stability and which do not become turbid or clouded even when placed on ice for considerable periods. The terms "beer" and "ale" are herein used in their usual acceptation as indicating lager beers and brilliant ales, as distinguished from medicinal preparations, such as malt extracts.

Most bottled beers, when correctly brewed and stored at low temperatures, will remain clear and brilliant for some time if placed upon ice directly after bottling. The same beers however, after pasteurization, are far less resistant to cold and usually cloud or become turbid when placed on ice. This sensitiveness to cold becomes more pronounced after the beers have been bottled for some time, and in many cases it is found that the beer not only clouds when chilled, but the bottles show a sediment consisting mainly of precipitated proteid matter. The probable reason for the clouding of chilled pasteurized beers is that during the pasteurization a part of the proteids contained in the beer are so modified that they become insoluble upon chilling, thereby causing turbidity.

According to the present process there is added to the beer at any suitable stage of the brewing, that is to say at any period subsequent to the cooling of the wort, and usually after the conclusion of the main fermentation, a proportion of proteolytic enzyms active in slightly acid media sufficient to modify the proteids contained in the beer in such manner that they will not be precipitated upon chilling subsequent to pasteurization, the beer being rendered chill-proof in the sense that it is capable of remaining brilliant even when kept upon ice for a considerable time. In practice it has been found advantageous in most cases to add the enzyms to the clarified beer shortly before bottling. During the pasteurization which follows the bottling, the enzyms become active, and those proteids which would cloud the beer when chilled are so modified by the proteolysis that the resulting beer will remain clear and brilliant, being no longer sensitive to cold. Beers and ales treated in accordance with this invention have been found to be substantially unaffected by exposure to diffused daylight for days or even weeks, and comparatively little affected even by the direct rays of the sun, whereas untreated beers, as is well known, rapidly acquire a highly disagreeable odor and flavor when exposed to sunlight, and quickly lose their brilliance, often depositing a sediment, under the action of diffused daylight. I have also found that if the proteolytic enzyms be added in sufficient quantity, and if excessive temperatures are not used during pasteurization, the enzyms remain active after pasteurization. By their activity subsequent to pasteurization they exert a further beneficial influence, inasmuch as they are found to have a peptonizing effect upon the proteids while the bottled beer is stored at ordinary temperatures. This fact is of particular advantage in the case of beers which are to be shipped long distances or stored in bottles for long periods, or which are required to undergo climatic changes; for such treatment as is well known increases greatly the sensitiveness of bottled beers with respect to cold and even produces a sediment in the bottles. The above described peptonization occurring at ordinary temperatures in the bottles is found however to impart to the beer the capability of enduring long storage, transportation or climatic change without becoming sensitive to cold.

It is not practicable to specify all proteolytic enzyms which are suited for use in accordance with this invention, or to state a definite proportion in which each should be added. Enzyms which are suitable for the purpose above described are widely distributed in the vegetable and animal kingdoms, are readily prepared in concentrated form by known methods, and their preparations have in several instances become standard articles of commerce. Such preparations are not however pure in the sense of consisting solely of enzyms or of a single enzym, and all proteolytic enzyms are in practice recognized only by their effects upon proteid matter. The source from which proteolytic enzyms are derived is not material or important, provided the preparation is free from constituents injurious to the beer and the enzyms are capable of exerting the proper modifying action upon the proteids under the conditions existing in beers or ales during or after pasteurization. The enzyms selected should be such as are capable of inducing proteolysis in slightly acid liquids, and such as are not destroyed or rendered permanently inactive by subjection to the usual temperatures of pasteurization. The activity of enzyms from various sources differs greatly, their activity being also affected by their mode of preparation or concentration; and inasmuch as the proportion or quantity to be used is dependent upon their activity, it is evident that such proportion or quantity can be specified only in particular cases, being however readily determined by simple test for each case.

Enzyms which are suited for use in accordance with this invention may be prepared from malt by known methods; (compare for example Fernbach and Hubert, *Compt. Rend. de l'Acad. des Sciences*, 1900, 130, 1783; 131, 293; Windisch and Schellhorn, *Wochensch. Brau.*, 1900, 17, 334; and Weiss, *Compt. Rend. Trav. Laborat. Carlsberg*, 1903, 5, 135). I have also been able to prepare an enzym capable of producing the above described effects upon beer in accordance with the following method: Green malt which has been permitted to grow for a period of one to two weeks according to conditions, is finely ground, preferably with the addition of quartz sand. The ground product is saturated with a solution containing 0.1 to 0.3 per cent. of hydrochloric acid and is permitted to stand at room temperatures for twelve to twenty-four hours. The acid liquid is then expressed under heavy pressure, and is mixed with several volumes of strong alcohol. The resulting precipitate contains the enzym, and is quickly separated from the liquid and dried *in vacuo* at temperatures not exceeding 40° C. It should be clearly understood that these enzyms are extremely sensitive to physical and chemical conditions, and may be rendered inactive by factors the presence of which it is often difficult or impossible to recognize. Hence it may occur that preparations made under seemingly identical conditions may differ widely in their activity or in their suitability for the purposes of this invention. Hence the preparations should in all cases be tested as to their effects upon beer before using them.

Besides the peptase prepared from malt, preparations containing proteolytic enzyms from other sources are well adapted for use, provided only they are active in slightly acid media and are free from substances injurious to the beer. Thus I may mention by way of example papain, derived from papaw, bromelin, from the fruit of the pineapple (see *Biochemie der Pflangen*, Czapek, Jena, 1905, Volume II, p. 167), and pepsin, from the gastric secretions of mammals. Those commercial preparations of papain and pepsin which exhibit a comparatively high degree of activity, say in excess of 1:3000 (that is to say which are capable under the standard conditions recited in the *U. S. Pharmacopœia* of digesting at least 3000 times their weight of freshly coagulated egg-albumen) have been found to be suitable for the purposes of this invention. It should be understood that zymogens convertible into proteolytic enzyms may serve as additions to the beer, giving rise therein to the respective enzyms. With reference to pepsin, it is commonly stated that this enzym is rapidly destroyed by warming to 55°–57° C.: I have found however that under the conditions obtaining during pasteurization of beer at temperatures of 57°–60° C., the pepsin exhibits activity both during and after pasteurization.

The proportion of the enzym to be added depends primarily upon the activity of the preparation, and secondarily upon the percentage of coagulable albuminoids in the beer. As a general rule, an enzym exhibiting an activity of 1:6000, may be employed in the proportion of one to five grams per barrel of thirty-one gallons of beer or ale, the proportion being increased or diminished according as the activity of the preparation may vary from the above standard, and according to the percentage of coagulable albuminoids contained in the beer. As above stated, the enzym is preferably added to the filtered or otherwise clarified beer shortly before bottling, but the addition may be made if desired at any other suitable stage of the process, as for example during storage. The addition of the enzym preparations in excessive proportions may render the beer again sensitive to cold.

It is a distinguishing characteristic of beers and ales prepared in accordance with this invention and containing active proteolytic enzyms, that they are not only themselves far less sensitive to cold than most pasteurized beers, but they are capable of imparting this quality under proper conditions to beers which are sensitive to cold from the presence therein of proteid matter. For example, if a beer containing proteolytic enzyms be mixed with an equal or lesser volume of a beer which becomes turbid from the separation of proteids when placed on ice, and the mixture kept for a suitable period at a temperature favorable to proteolysis, this mixture will be found thereafter to have acquired the property of remaining clear when subsequently chilled. This procedure constitutes, in the absence of interfering substances, as for example salts of tin or other heavy metals, a highly sensitive test for the presence of these enzyms in a state of activity. A highly sensitive test for the presence of pepsin in a state of activity in beer or ale is by digesting or proteolyzing the hydrochloric acid solution of the proteid known as edestin; or in general the enzyms in a state of activity can be detected by their proteolytic effects upon various albuminous substances or proteids, it being preferable to select for the detection of each enzym such proteids as are proven to be highly sensitive to its effects, as will be readily understood by those skilled in the art. The above tests are also applicable to the detection of proteolytic enzyms in various media other than beer or ale, as for example in plant or animal secretions or in preparations made therefrom.

I do not herein claim broadly the preparation of stable beers and ales by the addition thereto of proteolytic enzyms, or the beer or ales so treated, the said subject-matter, as well as the addition of such enzymatic preparations as may be derived from malt, being claimed in my copending application, Serial Number 554,645, filed April 11, 1910, whereof the present application is a division; nor do I claim herein the treatment of beer or ale with a proteolytic enzym derived from the gastric secretions of mammals, said subject-matter being claimed in an application filed concurrently herewith.

I claim:

1. In the art of brewing, the step which consists in adding papain to beer or ale, before bottling.

2. In the art of brewing, the step which consists in adding papain to beer or ale, and subsequently pasteurizing.

In testimony whereof, I affix my signature in presence of two witnesses.

LEO WALLERSTEIN.

Witnesses:
 THOS. GREEN,
 O. C. ANGEVINE.